United States Patent [19]

Sakiyama et al.

[11] 4,409,077

[45] Oct. 11, 1983

[54] ULTRAVIOLET RADIATION CURABLE COATING COMPOSITION

[75] Inventors: Kazuo Sakiyama, Ibaraki; Mitsuo Kuwata, Osaka; Masaru Oshiumi, Tokyo, all of Japan

[73] Assignees: Sumitomo Chemical Co., Ltd.; Sakata Shokai, Ltd., both of Osaka, Japan

[21] Appl. No.: 952,797

[22] Filed: Oct. 19, 1978

[30] Foreign Application Priority Data

Oct. 25, 1977 [JP] Japan .................................. 52-128352
Oct. 25, 1977 [JP] Japan .................................. 52-128353

[51] Int. Cl.$^3$ .......................... C08F 2/50; C08G 12/44
[52] U.S. Cl. ............................ 204/159.15; 204/159.14; 204/159.19; 525/514; 525/518
[58] Field of Search .......................... 260/856; 525/30; 430/917, 918; 526/261; 204/159.15

[56] References Cited

U.S. PATENT DOCUMENTS

| | | | |
|---|---|---|---|
| 2,443,741 | 6/1948 | Kropa ................................. | 526/261 |
| 2,709,693 | 5/1955 | Widmer ............................... | 526/261 |
| 2,829,119 | 4/1958 | Dudley et al. ....................... | 526/261 |
| 3,304,346 | 2/1967 | D'Alelio .............................. | 525/30 |
| 3,935,330 | 1/1976 | Smith et al. ........................ | 204/159.15 |
| 3,943,046 | 3/1976 | De Sorga et al. .............. | 204/159.15 |
| 4,140,605 | 2/1979 | Sano et al. ........................ | 204/159.12 |

Primary Examiner—Wilbert J. Briggs, Sr.
Assistant Examiner—A. H. Koechert
Attorney, Agent, or Firm—Birch, Stewart, Kolasch & Birch

[57] ABSTRACT

An ultraviolet radiation curable resin prepared by reaction of (A) an alkoxymethylated melamine, (B) an $\alpha,\beta$-ethylenically unsaturated compound having at least one hydroxyl group and (C) a polyol having at least two hydroxyl groups and/or a higher fatty acid ester having a least one hydroxyl group.

5 Claims, No Drawings

ULTRAVIOLET RADIATION CURABLE COATING COMPOSITION

The present invention relates to radiation curable resins, which show an excellent curability at irradiation of actinic energy rays, particularly ultraviolet rays, without suffering any inhibitive effect of polymerization by oxygen, and are useful as vehicles for coating, printing ink and adhesives, and their production and use.

In recent years, a curing-drying technique by utilization of photopolymerization by irradiation of actinic energy rays has been developed, and extensive studies have been made in this field.

When radical polymerization procedure is adopted for photopolymerization, however, conventional polymerizable resins are subjected to inhibition of polymerization by oxygen, and the surface of a coated film of such a resin is not cured completely but remains tacky.

For prevention of such inhibition of polymerization by oxygen, there is known a method which comprises introducing into the polymerizable resin a functional group having an activity to oxygen such as an allylether group or an unsaturated fatty acid residue. Though this chemical method is effective when it may take a long time for the curing, for example, in case of curing at room temperature or under heating, it shows little effectiveness in the case where the curing is done in a second by utilization of actinic energy rays.

On the other hand, there are known, as polymerizable prepolymers which are less susceptive of inhibition of polymerization by oxygen, (meth)acrylated melamine resins obtained by reaction of hydroxyl group-containing (meth)acrylate and hexamethoxymethyl melamine or hexamethylolmelamine [Japanese Patent Publication (unexamined) No. 9539/1974; Macromolecules 4 (5) 631 (1971)] and (meth)acrylated melamine resins partially etherified by alcohols such as methanol or glycidyl (meth)acrylate (Japanese Patent Publication No. 39238/1972). However, these (meth)acrylated melamine resins have a low viscosity being variable only in a narrow range, so that their uses are considerably restricted. Besides, the curability is still deteriorated in the presence of oxygen, though a good curability is shown in the absence of oxygen. In addition, the obtained coated films after curing are too hard and inferior in flexibility and adhesiveness.

There are also known compositions obtained by blending such (meth)acrylated melamine resins being insufficient in flexibility with other flexible resins such as polymerizable alkyd resins and unsaturated polyester resins [Japanese Patent Publication No. 19844/1976; Japanese Patent Publication (unexamined) No. 17890/1974]. Although flexibility can be obtained in these blended compositions, however, such compositions are much inferior in curability in comparison with the (meth)acrylated melamine resins and greatly susceptible to inhibition of polymerization by oxygen, so that the surface of a coated film of such composition is not cured sufficiently but remains tacky. This is particularly notable in case of using ultraviolet rays having a lower energy than electron beams.

Under these circumstances, the present inventors have made an extensive study for overcoming such drawbacks and now found that melamine resins modified with polyols and/or higher fatty acid esters show excellent curability.

The present invention provides a radiation curable resin which is obtained by reaction of (A) an alkoxymethylated melamine, (B) an $\alpha,\beta$-ethylenically unsaturated compound having at least one hydroxyl group and (C-1) a polyol having at least two hydroxyl groups and/or (C-2) a higher fatty acid ester having at least one hydroxyl group, and also provides a curable resin composition comprising the above-said curable resin and a polymerization initiator.

Since the said radiation curable resins of the present invention are modified with a polyol and/or higher fatty acid ester, inhibition of polymerization by oxygen is not caused at curing by irradiation of actinic energy rays. Besides, the curing rate is extremely fast in spite of lower concentration of $\alpha,\beta$-ethylenically unsaturated groups serving as the curing component in comparison with conventional (meth)acrylated melamine resins. Particularly in case of using a compound having multiple $\alpha,\beta$-ethylenically unsaturated groups as the component (B), the curing rate becomes much larger. Thus, the resins of the present invention show an extremely excellent curability. In addition, they are also superior in stability in storage, no change being observed after storage for 6 months or longer. The radiation curable resins of the present invention are utilizable for a variety of uses owing to their viscosities being variable in a wide range from a low value to a high value. Further, the resins of the present invention show an excellent compatibility with various kinds of polymerizable and non-polymerizable oils and fats and resins, so that the quality of coated film can be optionally varied depending on uses. Additionally, the resin of the present invention modified with the higher fatty acid ester as the component (C) shows an excellent solubility (washability) in various kinds of solvents, especially in kerosene and gasoline which are often used as a washing solvent for printing plates or rollers or printing and coating machines, so that it is not necessary a special, toxic solvent such as tetrahydrofuran or dimethylformamide as a washing solvent.

The obtained coated film after curing possesses a sufficient hardness and is superior in various physical and chemical properties such as flexibility, adhesiveness, gloss, weather resistance, chemical resistance, impact strength and heat resistance.

The alkoxymethylated melamine (A) as the reactive component of the radiation curable resin of the invention is a methylolmelamine in which a part or whole of the methylol groups are etherified. It is obtained by a reaction of methylolmelamine obtained from melamine and formaldehyde by a reaction in the presence of a basic catalyst, with an aliphatic alcohol such as methanol, ethanol, propanol, butanol, amyl alcohol or hexyl alcohol or an aromatic alcohol such as benzyl alcohol in the presence of an acidic catalyst, or by a reaction of melamines, formaldehyde and the alcohol in one step.

Examples of such alkoxymethylated melamine are alkoxymethylmelamines such as methoxymethylmelamines (e.g. trimethylolmelamine trimethyl ether, tetramethylolmelamine trimethyl ether, pentamethylolmelamine trimethyl ether, hexamethylolmelamine trimethyl ether, tetramethylolmelamine tetramethyl ether, pentamethylolmelamine tetramethyl ether, hexamethylolmelamine tetramethyl ether, pentamethylolmelamine pentamethyl ether, hexamethylolmelamine pentamethyl ether, hexamethylolmelamine hexamethyl ether) and corresponding ethoxymethylmelamines and butoxymethylmelamines. There are also included compounds in which different kinds of alkoxymethyl groups such as methoxymethyl group, ethoxymethyl group and butoxymethyl group are held on the same melamine nucleus. Dimer, trimer or so on of alkoxymethylated melamine condensed with methylene linkage, dimethylene ether linkage or other suitable linkage are also utilizable.

These compounds are not necesarrily used solely but a mixture of two or more kinds of them may be employed. They may be also employed as a mixture with amino resins such as methylolated or alkoxymethylated compounds of urea, guanamine, acetoguanamine and benzoguanamine, or as cocondensed products therewith.

The alkoxymethylated melamine to be used in the invention contains usually at least 3 alkoxymethyl groups, preferably 4 to 6 alkoxymethyl groups, per a melamine nucleus. Particularly preferred is hexakismethoxymethylmelamine.

As the $\alpha,\beta$-ethylenically unsaturated compound having at least one hydroxyl group (B), there may be exemplified allyl alcohol, glycerin diallyl ether, p-isopropenylphenol, esters of $\alpha,\beta$-ethylenically unsaturated carboxylic acids such as acrylic acid, methacrylic acid and itaconic acid with polyhydric alcohols, reaction products having at least one hydroxyl group obtained by reaction of epoxy compounds with $\alpha,\beta$-ethylenically unsaturated compounds having an activated hydrogen atom like a hydroxyl group, a carboxyl group or other groups [e.g. hydroxyl group-containing (meth)acrylates, (meth)acrylic acid, itaconic acid, methylol group-containing (meth)acrylamide] and methylol group-containing (meth)acrylamide.

Examples of the polyhydric alcohols are dihydric alcohols such as ethylene glycol, diethylene glycol, polyethylene glycol, propylene glycol, dipropylene glycol, polypropylene glycol, butanediol, hexanediol and neopentyl glycol and polyhydric alcohols such as glycerin, trimethylolethane, trimethylolpropane, pentaerythritol and their etherification-condensed products and aromatic polyhydric alcohols such as bisphenols, hydrogenated bisphenols, halogenated bisphenols, etc. There may be also employed as the polyhydric alcohol polyether polyols obtained by reaction of the above mentioned polyhydric alcohols with alkylene oxides and polyester polyols obtained by reaction of the above mentioned polyhydric alcohols with polybasic acids.

Specific examples of the $\alpha,\beta$-ethylenically unsaturated compound having at least one hydroxyl group which is an esterified product obtained by reaction of the polyhydric alcohol with the $\alpha,\beta$-ethylenically unsaturated carboxylic acid are ethylene glycol mono(meth)acrylate, diethylene glycol mono(meth)acrylate, polyethylene glycol mono(meth)acrylate, propylene glycol mono(meth)acrylate, dipropylene glycol mono(meth)acrylate, polypropylene glycol mono(meth)acrylate, butane diol mono(meth)acrylate, hexanediol mono(meth)acrylate, neopentyl glycol mono(meth)acrylate, glycerin mono(meth)acrylate, glycerin di(meth)acrylate, trimethylolethane mono(meth)acrylate, trimethylolethane di(meth)acrylate, trimethylolpropane mono(meth)acrylate, trimethylolpropane di(meth)acrylate, pentaerythritol mono(meth)acrylate, pentaerythritol di(meth)acrylate, pentaerythritol tri(meth)acrylate, dipentaerythritol tri(meth)acrylate, dipentaerythritol tetra(meth)acrylate, dipentaerythritol penta(meth)acrylate and corresponding itaconates.

As the said epoxy compound used for the reaction with the $\alpha,\beta$-ethylenically unsaturated compounds having an activated hydrogen atom to prepare the component (B), there may be exemplified epoxy group-containing (meth)acrylates such as glycidyl (meth)acrylate, ethylene oxide, propylene oxide, epichlorohydrin, methylepichlorohydrin, glycidyl esters of fatty acids and various epoxy resins such as polyglycol type, glycerin triether type, bisphenol type, resorcin type, novalak type and alicyclic type, epoxydized fats, epoxydized fatty acids, etc.

In case of the epoxy compound being glycidyl (meth)acrylate or the like, the activated hydrogen atom-containing compound is not always required to be the $\alpha,\beta$-ethylenically unsaturated compound.

As the methylol group-containing (meth)acrylamide, there may be exemplified N-methylol(meth)acrylamide, N-(hydroxymethyl)methylenebis(meth)acrylamide, etc.

These compounds as the component (B) may be employed solely or in combination.

The $\alpha,\beta$-ethylenically unsaturated compound having at least one hydroxyl group (B) is desired to have 1 to 3 hydroxyl groups, preferably 1 to 2 hydroxyl groups, in the molecule. Particularly preferred are ethylene glycol mono(meth)acrylate, propyleneglycol mono(meth)acrylate and N-methylol (meth)acrylamide.

The polyol having at least two hydroxyl groups (C-1) may be a compound having alcoholic or phenolic hydroxyl groups.

Examples of the compound having alcoholic hydroxyl groups are dihydric alcohols such as ethylene glycol, diethylene glycol, triethylene glycol, tetraethylene glycol and other polyethylene glycols, propylene glycol, dipropylene glycol, tripropylene glycol, tetrapropylene glycol and other polypropylene glycols, 1,3-propanediol, 1,4-butanediol, 1,3-butanediol, 1,5-pentanediol, neopentyl glycol, 1,6-hexanediol and 1,8-octanediol, polyhydric alcohols such as glycerin, trimethylolethane, trimethylolpropane, pentaerythritol, sorbitol and their etherification-condensed compounds. Examples of the phenolic hydroxyl group-containing compound are bisphenols, hydrogenated bisphenols, halogenated bisphenols and resorcinol. There may be employed polyether polyols obtained by reaction of the above mentioned polyhydric alcohols and alkylene oxides, polyester polyols obtained by reaction of the above mentioned polyhydric alcohols and polybasic acids, etc. There may be also employed methylol compounds obtained by reaction of phenols, xylenes or bisphenols with formaldehyde. These polyols may be used solely or in combination.

These polyols are desired to have 2 to 6 hydroxyl groups, preferably 2 to 3 hydroxyl groups, more preferably 2 hydroxyl groups, in the molecule. Particularly, the polyols having alcoholic hydroxyl groups are superior in respect of curability.

The higher fatty acid ester having at least one hydroxyl group (C-2) may be an alcoholysis reaction product of a fat and a polyhydric alcohol, a partial esterification reaction product of a higher fatty acid and a polyhydric alcohol, and an addition reaction product of a higher fatty acid or an activated hydrogen atom-containing higher fatty acid ester and an epoxy compound.

Examples of the fat are drying oils such as tung oil, linseed oil, perilla oil, soybean oil and dehydrated castor oil, semi-drying oils such as castor oil, cotton seed oil, sesame oil, corn oil, rape oil, safflower oil and tall oil, non-drying oils such as olive oil and tsubaki (camellia) oil, and other vegetable and animal oils and fats such as coconut oil, cacao butter, palm oil, sardine oil, cuttlefish oil and whale oil.

The higher fatty acid may be the one contained in the said oils and fats. Specific examples are unsaturated fatty acids such as eleostearic acid, linolic acid, linolenic acid, ricinoleinic acid, oleic acid and elaidic acid, saturated fatty acids such as stearic acid, palmitic acid, myristic acid, lauric acid and capric acid and dimer acids and trimer acids derived from unsaturated higher fatty acids. There may be also employed resin acids such as abietic acid contained in rosin.

As the polyhydric alcohol used for the production of the component (C-2), there may be used the said polyols (C-1) having alcoholic hydroxyl groups. As the epoxy compound used for the production of the component (C-2), the same epoxy compounds as in the component (B) may be employed. There is also utilizable oils and fats and fatty acids having hydroxyl groups such as castor oil, castor oil fatty acid, ricinoleinic acid and dioxystearic acid as the component (C-2). These compounds may be used solely or in combination.

The higher fatty acid ester (C-2) is desired to have 1 to 5 hydroxyl groups, preferably 1 to 3 hydroxyl groups. Particularly preferred are alcoholysis reaction products or esterification reaction products of drying oil, semi-drying oil or unsaturated higher fatty acids with polyhydric alcohols, and addition reaction products of higher fatty acids or activated hydrogen atom-containing higher fatty acid esters with epoxy compounds. Castor oil and castor oil fatty acid may be also employed advantageously.

The hydroxyl group-containing higher fatty acid ester (C-2) to be used in the invention may be prepared by a conventional procedure.

The alcoholysis reaction between said oils and fats and the polyhydric alcohols may be effected by treating the materials at a temperature of about 200° to 280° C. for about 3 to 7 hours in the stream of an inert gas in the presence of or absence of a catalyst such as an oxide or hydroxide of lead, zinc, calcium, lithium or sodium, as described in "Hardenable Resins and Their Processing" (edited by The Society of Polymer Science, Japan; published by Chinin Shokan, 395–389, 1964).

The alcoholysis reaction is an equilibrium reaction. As shown in "Resin processing", 6, 39 (1957), the reaction product is a mixture of various kinds of glycerides and unreacted materials. It is known that the composition of the mixture is largely varied depending on the molar ratio of the starting oils and fats and polyhydric alcohol and the kind of the latter.

The esterification reaction between the higher fatty acid and the polyhydric alcohol may be effected by heating the starting materials in the presence of an esterification catalyst such as sulfuric acid, nitric acid, hydrochloric acid, phosphoric acid, oxalic acid, p-toluenesulfonic acid or zinc chloride, if necessary, in a solvent such as benzene or toluene for distilling off produced water. In this reaction, an anti-coloring agent such as triphenyl phosphite may be also employed in case of necessity.

The reaction is carried out at about 70° to 250° C. for about 2 to 24 hours while distilling off produced water.

The said polyols (C-1) and the hydroxyl group-containing higher fatty acid esters (C-2) may be employed solely or in combination.

The proportion of the amounts of the alkoxymethylated melamine (A), the $\alpha,\beta$-ethylenically unsaturated compound having at least one hydroxyl group (B) and the polyol having at least two hydroxyl groups (C-1) and/or the higher fatty acid ester having at least one hydroxyl group (C-2) to be used in the invention is such that the amount of the hydroxyl groups in the component (B) becomes 1.0 to 5.5 mol in average, preferably 2.0 to 5.0 mol, to 1 mol of the component (A), and the amount of the hydroxyl groups in the components (C-1) and/or (C-2) becomes 0.5 to 5.0 mol in average, preferably 1.0 to 4.0 mol, to 1 mol of the component (A).

The said components may be subjected to the reaction in optional order or all at once. It is favorable to effect firstly the reaction of the component (A) with the component (C-1) and/or (C-2) and then to introduce the component (B) into the reaction system.

The reaction is carried out at 30° to 180° C., preferably 50° to 150° C., under atmospheric or reduced pressure in the presence of an acid catalyst. The temperature at which the reaction of the component (A) and the component (C-1) and/or (C-2) is effected is 50° to 180° C., preferably 70° to 150° C. The temperature at which the component (B) is subjected to reaction is 30° to 150° C., preferably 50° to 120° C. In the reaction of the component (B), a thermal polymerization inhibitor is preferably employed.

In this reaction, a polymerizable vinyl monomer having no hydroxyl group which is selected from the below mentioned polymerizable vinyl monomers may be used as a reaction medium with thermal polymerization inhibitors. There may be also employed various kinds of aliphatic or aromatic solvents as a reaction medium.

As the acid catalyst, inorganic acids such as sulfuric acid, nitric acid, hydrochloric acid and phosphoric acid and organic acids such as formic acid, oxalic acid and p-toluenesulfonic acid may be employed. Particularly preferred are sulfuric acid, phosphoric acid and p-toluenesulfonic acid. The acid catalyst is used in such an amount that the pH value of the reaction system becomes 1 to 6, preferably 2 to 5 [the pH value indicates the value obtained by determination at 25° C. on a mixture of the sample to be tested, water and acetone (1:1:1)].

Examples of the thermal polymerization inhibitor are hydroquinone, 2-methylhydroquinone, p-benzoquinone and t-butylpyrocatechol. The inhibitor is used usually in an amount of 50 to 3000 ppm to the $\alpha,\beta$-ethylenically unsaturated compound (B).

The thus obtained radiation curable resin may contain unreacted starting materials, or it may be partially urethanated with an isocyanate compound such as toluene diisocyanate or modified with an epoxy compound.

The radiation curable resin of the invention may be also prepared by a reaction of a methylolmelamine and the components (B), (C-1) and/or (C-2). But, the beforementioned process is more advantageous from the industrial and economical viewpoints.

The radiation curable resin of the invention is particularly useful as vehicles for coating and adhesives. In case of necessity, it may be blended with polymerization initiators, polymerizable vinyl monomers, coloring agents such as pigments and dyes, polymerizable and non-polymerizable oils and fats and resins and other additives.

As the polymerization initiator, various kinds of conventional substances may be employed. Examples thereof are photopolymerization initiators such as benzoins (e.g. benzoin, benzoin methyl ether, benzoin ethyl ether, benzoin isopropyl ether and benzoin butyl ether), benzophenones (e.g. benzophenone, p,p'-bis(dimethylamino)benzophenone and p,p'-bis(diethylamino)benzophenone), ketones (e.g. benzil, anthraquinones such as anthraquinone, 2-ethyl anthraquinone and 2-tert-butylanthraquinone), heterocyclic compounds (e.g. acrydine and phenadine), diazonium salts, halogenated hydrocarbons, acetophenone derivatives, sulfur compounds, polycyclic quinones and dye-redox system substances, and thermal polymerization initiators such as organic peroxides. These compounds may be used solely or in combination or admixed with chain transfer agents such as organic amines. The use of the polymerization initiator is not necessarily required in case of curing with high energy electron beams. But, when the curing is effected with low energy ultraviolet rays, it is employed usually in an amount of 0.1 to 30% by weight, preferably 1 to 15% by weight, to the radiation curable resin, or in case of using the below mentioned polymerizable vinyl monomers, to the total of the radiation curable resin and the polymerizable vinyl monomers.

As the polymerizable vinyl monomer, compounds having α,β-ethylenically unsaturated groups may be employed. Examples thereof are styrene, vinyltoluene, divinylbenzene, N-vinylpyrrolidone, methyl (meth)acrylate, ethyl (meth)acrylate, isopropyl (meth)acrylate, n-hexyl (meth)acrylate, 2-ethylhexyl (meth)acrylate, ethoxymethyl (meth)acrylate, lauryl (meth)acrylate, (meth)acrylic acid, (meth)acrylamide, N-methylol(meth)acrylamide, methylenebis(meth)acrylamide, glycidyl (meth)acrylate, n-butyl (meth)acrylate, ethylene glycol mono(meth)acrylate, ethylene glycol di(meth)acrylate, diethylene glycol di(meth)acrylate, polyethylene glycol di(meth)acrylate, propylene glycol mono(meth)acrylate, propylene glycol di(meth)acrylate, dipropylene glycol di(meth)acrylate, polypropylene glycol di(meth)acrylate, butanediol di(meth)acrylate, hexanediol di(meth)acrylate, neopentyl glycol di(meth)acrylate, trimethylolethane di(meth)acrylate, trimethylolethane tri(meth)acrylate, trimethylolpropane di(meth)acrylate, trimethylopropane tri(meth)acrylate, pentaerythritol tri(meth)acrylate, pentaerythritoltetra(meth)acrylate, dipentaerythritol hexa(meth)acrylate, 2,2-bis[4-(meth)acryloxyethoxyphenyl]propane, 2,2-bis[4-(meth)acryloxydiethoxyphenyl]propane, 2,2-bis[4-(meth)acryloxypropyloxyphenyl]propane, etc. From these compounds, suitable ones may be selected depending on uses. They may be used solely or in combination. The amount of the polymerizable vinyl monomer to be used is varied depending on applications of the produced radiation curable resin. In usual, it is used in an amount of 70% by weight or less, preferably 5 to 50% by weight.

As the coloring agent, various kinds of inorganic and organic pigments and dyes may be employed. Examples thereof are white pigments such as titanium oxide, zinc white and lithopone, extender pigments such as barium sulfate, calcium carbonate, talc, caoline, mica and alumina white, yellow pigments such as chrome yellow and C.I. Pigment Yellow 1, 3, 12, 13, red pigments such as C.I. Pigment Red 22, 48, 53, 57, 60, blue pigments such as C.I. Pigment Blue 15 and black pigments such as carbon black. The amount of the coloring agent to be used is 0 to 50% by weight, preferably 0 to 30% by weight.

As the polymerizable oils and fats and resins, there may be employed compounds containing unsaturated linkage. Examples thereof are drying and semi-drying oils such as tung oil, linseed oil and soybean oil and their polymerized products, synthetic drying oils, unsaturated polyester resins, epoxy (meth)acrylate, polyester (meth)acrylate, unsaturated urethane resins, unsaturated acryl resins, unsaturated polybutadiene resins, etc. As the non-polymerizable oils and fats and resins, there may be exemplified alkyd resins, modified alkyd resins, phenol resins, rosin-modified phenol resin, epoxy resins, urethane resins, acryl resins, polybutadiene resins, petroleum resins, gilsonite, etc. These polymerizable oils and fats and resins may be used in an amount of about 50% by weight or less, preferably 30% by weight or less, to the total amount of the composition. The non-polymerizable oils and fats and resins may be used in such an amount as not deteriorating the quality of the composition, i.e. in about 10% by weight or less.

There may be also employed various plasticizers such as dioctyl phthalate, dioctyl sebatate and dibutyl fumarate, antifoaming agents such as silicone, levelling-improving agents, surface active agents, skinning-preventing agents, drying agents such as cobalt naphthenate, viscosity-increasing agents, off setting-preventing agents, wax, solvents, etc. The amount of these additives to be incorporated is about 10% by weight or less, preferably about 5% by weight or less.

The kinds and the amounts of these additives to be used should be decided in consideration of their uses and purposes.

The radiation curable resin composition comprising the resin of the invention may be applied to various materials such as paper, metals, plastics, glass, ceramics, fibers, wood and stone. It is useful as printing ink for lithographic printing, relief printing, intaglio printing and screen printing, vehicles for coating such as over print varnish, paints, coating agents, adhesives, etc. It is also utilizable for resists such as etching resist, plating resist and solder resist, relief pattern-forming agents, printing plates, etc.

The radiation curable resin or composition of the present invention is irradiated with a source of actinic radiation such as radioactive radiation (e.g. α-radiation emitters, β-radiation emitters, γ-radiation emitters, X-ray), high energy electron beams and ultraviolet rays to effect the curing. Particularly preferred are high energy electron beams and ultraviolet rays.

The present invention will be hereinafter explained further in detail by the following Examples which are not intended to limit the scope of the invention. In these Examples, the viscosity indicates the value obtained by determination by the aid of a Gardner-Holdt bubble viscometer.

EXAMPLE 1

In a flask equipped with a stirrer, a thermometer and a cooling condenser linked with a pressure-reducing apparatus and a cooled trap, Sumimal M-100 ® (hexakismethoxymethylmelamine manufactured by Sumitomo Chemical Company, Limited) (390 g) and 1,4-butanediol (45 g) are charged, and 85% phosphoric acid (0.25 ml) is added thereto. The contents are heated at 110° to 120° C. while distilling out methanol under atmospheric pressure. When the amount of methanol distilled out becomes 31 g, the reaction system is cooled to 35° C., and 2-methylhydroquinone (0.6 g), ethylene glycol monoacrylate (580 g) and p-toluenesulfonic acid (1.2 g) are added thereto. The mixture is heated at 80° to 95° C. while distilling out methanol under a reduced pressure of about 45 mmHg. When the total amount of methanol distilled out becomes 190 g, the pressure is elevated to normal level, and the reaction system is cooled. The thus obtained reaction product is a colorless transparent liquid having a viscosity of Z 4.

EXAMPLE 2

In the same manner as in Example 1, the first step of reaction is carried out but using propylene glycol (114 g) in place of 1,4-butanediol, and 85% phosphoric acid (0.20 ml) to distill out methanol. When the amount of methanol distilled out becomes 95 g, the reaction system is cooled to 35° C. Then, 2-methylhydroquinone (0.4 g), ethylene glycol monoacrylate (348 g) and p-toluenesulfonic acid (0.9 g) are added thereto, and the mixture is heated at 85° to 95° C. while distilling out methanol under a reduced pressure of about 45 mmHg. When the total amount of methanol distilled out becomes 188 g, the pressure is elevated to normal level, and the reaction system is cooled. The thus obtained product is a pale yellow, transparent liquid having a viscosity of Z 7.

EXAMPLE 3

In the same manner as in Example 1, the first step of reaction is carried out but using polyethylene glycol (molecular weight, 200) (100 g), in place of 1,4-butanediol, and 85% phosphoric acid (0.23 ml) to distilled out methanol. When the amount of methanol distilled out becomes 30 g, the reaction system is cooled. Then, 2-methylhydroquinone (0.5 g), propylene glycol monoacrylate (520 g) and p-toluenesulfonic acid (1.1 g) are added thereto, and the mixture is heated at 85° to 100° C. while distilling out methanol under a reduced pressure of about 40 mmHg. When the total amount of methanol distilled out becomes 150 g, the pressure is elevated to normal level, and the reaction system is cooled. The thus obtained product is a colorless, transparent liquid having a viscosity of Z 3.

EXAMPLE 4

In the same manner as in Example 1, the first step of reaction is carried out but using hydrogenated bisphenol A (114 g), in place of 1,4-butanediol, and 85% phosphoric acid (0.20 ml) to distill out methanol. When the amount of methanol distilled out becomes 31 g, the reaction system is cooled. Then, 2-methylhydroquinone (0.5 g), ethylene glycol monoacrylate (464 g) and 10 N sulfuric acid (0.65 ml) are added thereto, and the mixture is heated at 80° to 95° C. while distilling out methanol under a reduced pressure of about 45 mmHg. When the total amount of methanol distilled out becomes 152 g, the pressure is elevated to normal level, and the reaction system is cooled. The thus obtained product is a colorless, transparent liquid having a viscosity of Z 7.

EXAMPLE 5

In the same manner as in Example 1, the first step of reaction is carried out but using an addition reaction product of bisphenol A and propylene oxide (Adekapolyether BPX-11 ® manufactured by Asahi Denka Kogyo K.K.; OH value, 316) (158 g), in place of 1,4-butanediol, and 85% phosphoric acid (0.30 ml) to distill out methanol. When the amount of methanol distilled out becomes 30 g, the pressure is elevated to normal level, and the reaction system is cooled. Then, 2-methylhydroquinone (0.6 g), propylene monoacrylate (650 g) and p-toluenesulfonic acid (1.20 g) are added thereto, and the second step of reaction is effected in the same manner as in Example 1 to distill out methanol. When the total amount of methanol distilled out becomes 190 g, the pressure is elevated to normal level, and the reaction system is cooled. The thus obtained product is a colorless, transparent liquid having a viscosity of Z 6-Z 7.

EXAMPLE 6

In the same manner as in Example 1, the first step of reaction is carried out but using propylene glycol (38 g), in place of 1,4-butanediol, and 85% phosphoric acid (0.15 ml) to distill out methanol. When the amount of methanol distilled out becomes 32 g, the reaction system is cooled to 40° C. Then, 2-methylhydroquinone (0.5 g), ethylene glycol monoacrylate (440 g), N-methylolacrylamide (121 g) and p-toluenesulfonic acid (1.12 g) are added thereto, and the mixture is treated in the same manner as in Example 1 to distill out methanol. When the total amount of methanol distilled out becomes 186 g, the pressure is elevated to normal level, and the reaction system is cooled. The thus obtained product is a colorless, transparent liquid having a viscosity of Z 6.

EXAMPLE 7

In the same manner as in Example 1, the first step of reaction is carried out but using ethylene glycol (31 g), in place of 1,4-butanediol, and 85% phosphoric acid (0.15 ml) to distill out methanol. When the amount of methanol distilled out becomes 30 g, the reaction system is cooled. Then, 2-methylhydroquinone (1.0 g), an addition reaction product of glycidyl acrylate and acrylic acid (200 g), ethylene glycol monoacrylate (464 g) and p-toluenesulfonic acid (1.50 g) are added thereto, and the mixture is heated at 80° to 95° C. while distilling out methanol under a reduced pressure of about 50 mmHg. When the total amount of methanol distilled out becomes 185 g, the pressure is elevated to normal level, and the reaction system is cooled. The thus obtained product is a pale yellow, transparent liquid having a viscosity of Z 5.

EXAMPLE 8

(1) In a flask equipped with a stirrer, a thermometer and a reflux condenser, polyglycol type epoxy resin (epoxy equivalent, 170; Denacol ® 820 manufactured by Nagase Sangyo K.K.) (187 g), acrylic acid (79.2 g) and 2-methylhydroquinone (0.10 g) are charged, and, after addition of triethylamine (0.8 g), the contents are heated at 100° to 110° C. When the acid value becomes 4.3 (KOH mg/g), the reaction system is cooled to obtain epoxy acrylate.

(2) In the same manner as in Example 1, the first step of reaction is carried out but using propylene glycol (38 g), in place of 1,4-butanediol, and 85% phosphoric acid (0.20 ml) to distill out methanol. When the amount of methanol distilled out becomes 31 g, the reaction system is cooled. Then, 2-methylhydroquinone (0.80 g), the said epoxy acrylate obtained in (1) (121 g), propylene glycol monoacrylate (520 g) and p-toluenesulfonic acid (1.80 g) are added thereto, and the mixture is heated at 80° to 95° C. while distilling out methanol under a reduced pressure of about 45 mmHg. When the total amount of methanol distilled out becomes 173 g, the pressure is elevated to normal level, and the reaction system is cooled. The thus obtained product is a pale yellow, transparent liquid having a viscosity of Z 6.

EXAMPLE 9

In the same manner as in Example 1, the first step of reaction is carried out but using propylene glycol (30.4 g) and trimethylolpropane (13.4 g), in place of 1,4-butanediol, to distill out methanol. When the amount of methanol distilled out becomes 32 g, the reaction system is cooled. Then, 2-methylhydroquinone (0.70 g), ethylene glycol monoacrylate (406 g), propylene glycol monomethacrylate (202 g) and 98% sulfuric acid (0.15 ml) are added thereto, and the mixture is heated at 80° to 90° C. while distilling out methanol under a reduced pressure of about 50 mmHg. When the total amount of methanol distilled out becomes 188 g, the pressure is elevated to normal level, and the reaction system is cooled. The thus obtained product is a colorless, transparent liquid having a viscosity of Z 3.

EXAMPLE 10

The same procedure as in Example 1 is repeated but using ethylene glycol monoacrylate (464 g) and ethylene glycol monomethacrylate (130 g) in place of ethylene glycol monoacrylate in the second step of reaction. When the total amount of methanol distilled out becomes 187 g, the pressure is elevated to normal level, and the reaction system is cooled. The thus obtained product is a colorless, transparent liquid having a viscosity of Z 2 to Z 3.

EXAMPLE 11

In the same manner as in Example 1, the first step of reaction is carried out but using polyethylene glycol (molecular weight, 1500) (750 g), in place of 1,4-butanediol, and 85% phosphoric acid (0.25 ml) to distill out methanol. When the amount of methanol distilled out becomes 30 g, the reaction system is cooled. Then, 2-methylhydroquinone (0.5 g), ethylene glycol monoacrylate (348 g), ethylene glycol monomethacrylate (130 g) and 10 N sulfuric acid (1.0 ml) are added thereto, and the mixture is heated at 80° to 95° C. while distilling out methanol under a reduced pressure of about 50 mmHg. When the total amount of methanol distilled out becomes 155 g, the pressure is elevated to normal level, and the reaction system is cooled. The thus obtained product is a colorless, transparent liquid having a viscosity of Z 6 to Z 7.

EXAMPLE 12

(1) In a flask equipped with a stirrer, a thermometer, a cooling condenser and a nitrogen gas-introducing apparatus, soybean oil (453 g), glycerin (96 g) and lead oxide (1.2 g) are charged, and the temperature is elevated up to 220° C. while introducing nitrogen gas. The contents are kept at the same temperature for 4 hours and then cooled to obtain a pale yellow, transparent product of alcoholysis reaction.

(2) In a flask equipped with a stirrer, a thermometer, and a cooling condenser linked with a pressure-reducing apparatus and a cooled trap, Sumimal M-100 ® (390 g) and the said alcoholysis reaction product obtained in (1) (528 g) are charged, and 85% phosphoric acid (3.5 ml) is added thereto. The contents are heated at 110° to 130° C. while distilling out methanol under a reduced pressure of about 50 mmHg. When the amount of methanol distilled out becomes 75 g, the pressure is elevated to normal level, and the reaction system is cooled. Then, 2-methylhydroquinone (0.4 g), propylene glycol monoacrylate (390 g) and p-toluenesulfonic acid (0.8 g) are added thereto. The mixture is heated at 80° to 95° C. while distilling out methanol under a reduced pressure of about 50 mmHg. When the total amount of methanol distilled out becomes 160 g, the pressure is elevated to normal level, and the reaction system is cooled. The thus obtained reaction product is a pale yellow, transparent liquid having a viscosity of Z 2.

EXAMPLE 13

(1) The same procedure as in Example 12 (1) is repeated but using linseed oil (309 g), glycerin (64 g) and calcium hydroxide (0.7 g) to obtain a pale yellow, transparent product of alcoholysis reaction.

(2) Using Sumimal M-100 ® (390 g), the said alcoholysis reaction product obtained in (1) (354 g) and 85% phosphoric acid (2.5 ml), the same procedure as in Example 12 (2) is repeated. When the amount of methanol distilled out becomes 64 g, the pressure is elevated to normal level, and the reaction system is cooled. Then, 2-methylhydroquinone (0.4 g), ethylene glycol monoacrylate (464 g) and 85% phosphoric acid (2.5 ml) are added thereto, and the mixture is heated at 85° to 95° C. while distilling out methanol under a reduced pressure of about 50 mmHg. When the total amount of methanol distilled out becomes 192 g, the pressure is elevated to normal level, and the reaction system is cooled. The thus obtained reaction product is a pale yellow, transparent liquid having a viscosity of Z 1.

EXAMPLE 14

In the same manner as in Example 13 (2), the reaction of Sumimal M-100 ® (390 g) with the same alcoholysis reaction product obtained in Example 13 (1) (177 g) is carried out under normal pressure. When the amount of methanol distilled out becomes 32 g, the reaction system is cooled. Then, 2-methylhydroquinone (0.6 g), ethylene glycol monoacrylate (580 g) and p-toluenesulfonic acid (1.3 g) are added thereto, and the mixture is heated at 80° to 95° C. while distilling out methanol under a reduced pressure of about 30 mmHg. When the total amount of methanol distilled out becomes 192 g, the pressure is elevated to normal level, and the reaction system is cooled. The thus obtained reaction product is a pale yellow, transparent liquid having a viscosity of W.

EXAMPLE 15

(1) The same procedure as in Example 12 (1) is repeated but using tung oil (331 g), glycerin (35 g) and calcium hydroxide (0.7 g) to obtain a pale yellow, transparent product of alcoholysis reaction.

(2) Using Sumimal M-100 ® (390 g), the said alcoholysis reaction product obtained in (1) (320 g) and 85% phosphoric acid (3.0 ml), the reaction is carried out as in Example 12 (2) at 105° to 130° C. while distilling out methanol under normal pressure. When the amount of methanol distilled out becomes 20 g, the reaction system is cooled. Then, 2-methylhydroquinone (0.4 g), ethylene glycol monoacrylate (348 g) and p-toluenesulfonic acid (0.7 g) are added thereto, and the mixture is heated at 80° to 95° C. while distilling out methanol under a reduced pressure of about 75 mmHg. When the total amount of methanol distilled out becomes 100 g, the pressure is elevated to normal level, and the reaction system is cooled. The thus obtained reaction product is a pale yellow, transparent liquid having a viscosity of Z 6.

EXAMPLE 16

Using Sumimal M-100 ® (390 g), the same alcoholysis reaction product obtained in Example 13 (1) (177 g), 2-methylhydroquinone (0.5 g), ethylene glycol monoacrylate (350 g), N-methylolacrylamide (100 g) and 10 N sulfuric acid (3.5 ml), the reaction is carried out at 75° to 95° C. while distilling out methanol under a reduced pressure of about 55 mmHg. When the total amount of methanol distilled out becomes 130 g, the pressure is elevated to normal level, and the reaction system is cooled to obtain as the reaction product a pale yellow, transparent liquid having a viscosity of Z 5.

EXAMPLE 17

(1) Using oleic acid (450 g), glycerin (49 g), propylene glycol (38 g) and zinc chloride (1.0 g), an esterification reaction is carried out at 180° to 220° C. When the amount of produced water becomes 28 g, the reaction system is cooled to obtain a pale yellow, transparent product of partial esterification reaction.

(2) Using Sumimal M-100 ® (390 g), the said partial esterification reaction product obtained in (1) (478 g) and 85% phosphoric acid (4.0 ml), the same procedure as in Example 12 (2) is repeated. When the amount of methanol distilled out becomes 30 g, the pressure is elevated to normal level, and the reaction system is cooled. Then, 2-methylhydroquinone (0.5 g), propylene glycol monoacrylate (260 g), an addition reaction product of glycidyl acrylate and acrylic acid (200 g) and 85% phosphoric acid (3.0 ml) are added thereto, and the mixture is treated in the same manner as in Example 12 (2). When the total amount of methanol distilled out becomes 120 g, the pressure is elevated to normal level, and the reaction system is cooled. The thus obtained reaction product is a pale yellow, transparent liquid having a viscosity of Z 3.

EXAMPLE 18

(1) In a flask equipped with a stirrer, a thermometer and a cooling condenser, Sumiepoxy ELA-128 ® (bisphenol A type epoxy resin; epoxy equivalent, 187; manufactured by Sumitomo Chemical Company, Limited) (206 g) and oleic acid (309 g) are charged, and after addition of triethylamine (2.6 g) as the catalyst, the contents are heated at 100° to 120° C. to obtain an epoxy ester of higher fatty acid.

(2) Using Sumimal M-100 ® (390 g), the said epoxy ester of higher fatty acid obtained in (1) (468 g) and 10 N sulfuric acid (3.0 ml), the same procedure as in Example 12 (2) is repeated. When the amount of methanol distilled out becomes 30 g, the pressure is elevated to normal level, and the reaction system is cooled. Then, 2-methylhydroquinone (0.3 g), ethylene glycol monoacrylate (348 g) and p-toluenesulfonic acid (0.7 g) are added thereto, and the mixture is treated in the same manner as in Example 12 (2). When the total amount of methanol distilled out becomes 90 g, the pressure is elevated to normal level, and the reaction system is cooled. The thus obtained reaction product is a pale yellow, transparent liquid having a viscosity of Z 6.

EXAMPLE 19

In a flask equipped with the same apparatus as in Example 12 (2), Sumimal M-100 ® (390 g), castor oil (917 g), 2-methylhydroquinone (0.4 g) and ethylene glycol monoacrylate (406 g) are charged, and after addition of 85% phosphoric acid (4.0 ml) and p-toluenesulfonic acid (0.8 g), the contents are heated at 80° to 95° C. while distilling out methanol under a reduced pressure of about 50 mmHg. When the total amount of methanol distilled out becomes 186 g, the pressure is elevated to normal level, and the reaction system is cooled to obtain as the reaction product a pale yellow, transparent liquid having a viscosity of Z 5.

EXAMPLE 20

In a flask equipped with the same apparatus as in Example 12 (2), Sumimal M-100 ® (390 g) and the same alcoholysis reaction product obtained in Example 13 (1) (352 g) are charged, and the contents are heated at 110° to 125° C. while distilling out methanol under a reduced pressure of about 50 mmHg. When the amount of methanol distilled out becomes 62 g, the pressure is elevated to normal level, and the reaction system is cooled. Then, 2-methylhydroquinone (0.5 g), the epoxy acrylate obtained in Example 8 (1) (133 g), propylene glycol monoacrylate (390 g) and p-toluenesulfonic acid (1.0 g) are added thereto, and the mixture is heated at 80° to 95° C. while distilling out methanol under a reduced pressure of about 50 mmHg. When the total amount of methanol distilled out becomes 174 g, the pressure is elevated to normal level, and the reaction system is cooled. The thus obtained reaction product is a pale yellow, transparent liquid having a viscosity of Z 3.

EXAMPLE 21

In a flask equipped with the same apparatus as in Example 12 (2), Sumimal M-100 ® (390 g), 1,4-butanediol (45 g) and the same alcoholysis reaction product obtained in Example 13 (1) (178 g) are charged and 85% phosphoric acid (3.7 ml) is added thereto. The contents are heated at 110° to 140° C. while distilling out methanol under normal pressure. When the amount of methanol distilled out becomes 60 g, the reaction system is cooled, and p-benzoquinone (0.5 g), ethylene glycol monoacrylate (464 g) and p-toluenesulfonic acid (0.8 g) are added thereto. The mixture is heated at 75° to 95° C. while distilling out methanol under a reduced pressure of about 40 mmHg. When the total amount of methanol distilled out becomes 185 g, the pressure is elevated to normal level, and the reaction system is cooled. The thus obtained reaction product is a pale yellow, transparent liquid having a viscosity of Z 5 to Z 6.

REFERENCE EXAMPLE 1

In a flask equipped with the same apparatus as in Example 1, Sumimal M-100 ® (390 g), 2-methylhydroquinone (0.5 g) and ethylene glycol monoacrylate (464 g) are charged, and after addition of p-toluenesulfonic acid (3.0 g), the contents are heated at 85° to 95° C. while distilling out methanol under a reduced pressure of about 40 mmHg. When the amount of methanol distilled out becomes 115 g, the pressure is elevated to normal level, and the reaction system is cooled to obtain a colorless, transparent liquid having a viscosity of Q. From the calculation based on the amount of methanol distilled out, the thus obtained product is proved to be acrylated melamine resin having about 3.6 acryl groups on the melamine nucleus.

REFERENCE EXAMPLE 2

In a flask equipped with a stirrer, a thermometer and a cooling condenser, bisphenol A type epoxy resin with epoxy equivalent of 184 to 194 (Sumiepoxy ELA-128 ® manufactured by Sumitomo Chemical Company, Limited) (247 g), 2-methylhydroquinone (0.2 g) and acrylic acid (94 g) are charged, and after addition of triethylamine (1.7 g) as the catalyst, the contents are heated at 110° to 120° C. When the acid value becomes 3.2 (KOH mg/g), the reaction system is cooled to 45° C. Since the reaction product is highly viscous, it is diluted with a mixture of 2-methylhydroquinone (0.1 g) and trimethylolpropane triacrylate (146 g) as polymerizable vinyl monomer to obtain a pale yellow, transparent liquid having a viscosity of Z 6.

REFERENCE EXAMPLE 3

The same procedure as in Reference Example 2 is repeated but using 2-methylhydroquinone (0.1 g), acrylic acid (58.5 g), linolic acid (136.5 g) and triethylamine (2.0 g). When the acid value becomes 4.3 (KOH mg/g), the reaction system is cooled to 40° C. Then, the reaction product is diluted with a mixture of 2-methylhydroquinone (0.2 g) and trimethylolpropane triacrylate (235 g) as polymerizable vinyl monomer to obtain a pale yellowish brown, transparent liquid having a viscosity of Z 3. This substance is a fatty acid-modified product of the compound obtained in Reference Example 2.

EXAMPLE 22

To each of the reaction products (93 g) (radiation curable resins) obtained in Examples 1 to 11 and 21 and Reference Examples 1 to 3, benzoin methyl ether (7 g) as the photopolymerization initiator is added to prepare an ultraviolet ray-curable resin composition, which is applied on the surface of a glass plate by the aid of a bar coater to make a thickness of about 10μ. Then, the coated surface is irradiated with ultraviolet rays in the air from the distance of 15 cm by the aid of an ultraviolet ray-irradiating apparatus (main wavelength, 365 nm; power, 80 W/cm$^2$) to examine the curability of the resin composition.

The curability is indicated by the irradiation time required for making the coated film surface non-tacky. The judgement is effected by touch with a finger. The results are shown in Table 1.

TABLE 1

| Radiation curable resin | Curing time (sec.) |
|---|---|
| Example 1 | 2.0 |
| 2 | 2.5 |
| 3 | 1.5 |
| 4 | 1.0 |
| 5 | 1.5 |
| 6 | 1.5 |
| 7 | 2.5 |

TABLE 1-continued

| Radiation curable resin | Curing time (sec.) |
|---|---|
| 8 | 1.5 |
| 9 | 4.0 |
| 10 | 4.0 |
| 11 | 3.5 |
| 21 | 3.0 |
| Reference Example 1 | 8.0 |
| 2 | 6.0 |
| 3 | 24.0 |

EXAMPLE 23

To each of the reaction products (95 g) (radiation curable resins) obtained in Examples 12 to 21 and Reference Examples 1 to 3, benzoin methyl ether (5 g) as the photopolymerization initiator is added to prepare a photo-curable resin composition. The curability of the thus obtained resin composition is investigated in the same manner as in Example 22. The results are shown in Table 2.

TABLE 2

| Radiation curable resin | Curing time (sec.) |
|---|---|
| Example 12 | 4.0 |
| 13 | 3.0 |
| 14 | 2.5 |
| 15 | 3.5 |
| 16 | 2.0 |
| 17 | 4.0 |
| 18 | 2.0 |
| 19 | 5.0 |
| 20 | 2.0 |
| 21 | 4.0 |
| Reference Example 1 | 9.0 |
| 2 | 7.0 |
| 3 | 25.0 |

EXAMPLE 24

To each of the reaction products (45 g) (radiation curable resins) obtained in Examples 1 to 7 and Reference Examples 1 to 3, 1,6-hexanediol diacrylate (10.5 g), 2-ethylhexyl acrylate (20 g), unsaturated polyester obtained from propylene glycol, ethylene glycol, isophthalic acid and maleic anhydride (molecular weight, about 2500) (15 g), dioctyl phthalate (2.5 g) and benzoin isobutyl ether (7 g) are added to prepare an ultraviolet ray-curable clear paint. The thus obtained composition is applied on the surface of a soft steel plate treated with zinc phosphate by the aid of a bar coater to make a thickness of about 20μ, and curing is effected by the use of the same ultraviolet ray-irradiating apparatus as in Example 22. The physical properties of the thus cured coated film are shown in Table 3.

TABLE 3

| Photocurable resin | Physical Properties | | | | | |
|---|---|---|---|---|---|---|
| | Pencil hardness | Close-adherence (peeling-off of 1 mm square tape) | DuPont impact (500 g) | Flexion-resistance (flexion tester) | Acid-resistance (5% HCl, 20° C., 24 hrs.) | Alkali-resistance (2% NaOH, 24 hrs.) |
| Example 1 | 3H | 100/100 | 50 cm accepted | 3 mm⌀ accepted | Normal | Normal |
| 2 | 4H | 90/100 | 50 cm accepted | 3 mm⌀ accepted | Normal | Normal |
| 3 | 2H | 100/100 | 50 cm accepted | 2 mm⌀ accepted | Normal | Normal |
| 4 | 5H | 90/100 | 50 cm accepted | 4 mm⌀ accepted | Normal | Normal |
| 5 | 4H | 100/100 | 50 cm | 3 mm⌀ | Normal | Normal |

TABLE 3-continued

| Photocurable resin | | Pencil hardness | Close-adherence (peeling-off of 1 mm square tape) | DuPont impact (500 g) | Flexion-resistance (flexion tester) | Acid-resistance (5% HCl, 20° C., 24 hrs.) | Alkali-resistance (2% NaOH, 24 hrs.) |
|---|---|---|---|---|---|---|---|
| | 6 | 3H | 90/100 | 50 cm accepted | 4 mmØ accepted | Normal | Normal |
| | 7 | 4H | 90/100 | 50 cm accepted | 4 mmØ accepted | Normal | Normal |
| Reference Example | 1 | 3H | 30/100 | 10 cm accepted | 10 mmØ unaccepted | Normal | Normal |
| | 2 | 3H | 80/100 | 30 cm accepted | 6 mmØ accepted | Normal | Peeled off |
| | 3 | B | 100/100 | 50 cm accepted | 4 mmØ accepted | Normal off | Peeled |

EXAMPLE 25

To each of the reaction products (70 g) obtained in Examples 12 to 18 and Reference Examples 1 to 3, 1,6-hexanediol diacrylate (10 g), 2-ethylhexyl acrylate (15 g), benzil (2 g) and 2-ethylanthraquinone (3 g) are added to prepare an ultraviolet ray-curable clear paint. The thus obtained composition is applied on the surface of a soft steel plate treated with zinc phosphate by the aid of a bar coater to make a thickness of about 35μ, and curing is effected by the use of the same ultraviolet ray-irradiating apparatus as in Example 22. The physical properties of the thus cured coated film are shown in Table 4.

prepared ultraviolet ray-curable over print varnish is printed on the printed surface not yet dried to make a thickness of about 10μ, and irradiation of ultraviolet rays is effected in the same manner as in Example 22. The curability and the gloss of the cured coated film are investigated, and then the washability is tested by scrubbing the unirradiated area on the printed material with absorbent cotton impregnated with kerosene 30 times. The results are shown in Table 5.

The numeral of the gloss indicates the value obtained by determination with 60° reflection. The estimation of the washability is effected according to the following criterium: the ink is dissolved in kerosene and completely removed off—O; the ink turns white and turbid

TABLE 4

| Photocurable resin | | Pencil hardness | Close-adherence (peeling-off of 1 mm square tape) | DuPont impact (500 g) | Flexion-resistance (flexion tester) | Acid-resistance (5% HCl, 20° C., 24 hrs.) | Alkali-resistance (2% NaOH, 24 hrs.) |
|---|---|---|---|---|---|---|---|
| Example | 12 | 2H | 100/100 | 50 cm accepted | 2 mmØ accepted | Normal | Normal |
| | 13 | 3H | 100/100 | 50 cm accepted | 2 mmØ accepted | Normal | Normal |
| | 14 | 4H | 100/100 | 50cm accepted | 2mmØ accepted | Normal | Normal |
| | 15 | 2H | 100/100 | 50 cm accepted | 2 mmØ accepted | Normal | Normal |
| | 16 | 3H | 100/100 | 50 cm accepted | 3 mmØ accepted | Normal | Normal |
| | 17 | 3H | 100/100 | 50 cm accepted | 2 mmØ accepted | Normal | Normal |
| | 18 | 2H | 100/100 | 50 cm accepted | 2 mmØ accepted | Normal | Normal |
| Reference Example | 1 | 3H | 30/100 | 10 cm accepted | 10 mmØ unaccepted | Normal | Normal |
| | 2 | 3H | 80/100 | 30 cm accepted | 6 mmØ accepted | Normal | Peeled off |
| | 3 | B | 100/100 | 50 cm accepted | 4 mmØ accepted | Normal off | Peeled |

EXAMPLE 26

To each of the reaction products (93 g) obtained in Examples 12 to 15 and Reference Examples 1 to 3, benzoin methyl ether (7 g) is added to obtain an ultraviolet ray-curable over print varnish.

On the other hand, the surface of coated paper is printed with a conventional oxidation polymerization-drying printing ink comprising rosin-modified phenol resin, alkyd resin, phthalocyanine blue pigment, mineral oils and additives such as drier and wax. The above and is partially removed off—Δ; the ink is not miscible with kerosene and no washing is effected—X.

TABLE 5

| Curable resin | Example of invention | | | | Reference Example | | |
|---|---|---|---|---|---|---|---|
| | 12 | 13 | 14 | 15 | 1 | 2 | 3 |
| Curing time (sec.) | 3.0 | 2.5 | 1.5 | 3.0 | 5.5 | 4.0 | 21.0 |
| Gloss (60°) | 61.3 | 62.0 | 65.5 | 56.5 | 29.8 | 27.3 | 35.4 |

TABLE 5-continued

| Curable | Example of invention | | | | Reference Example | | |
|---|---|---|---|---|---|---|---|
| resin | 12 | 13 | 14 | 15 | 1 | 2 | 3 |
| Washability | O | O | O~Δ | O | X | X | Δ |

EXAMPLE 27

To each of the reaction products (75 g) obtained in Examples 1 to 7 and 16 to 18, phthalocyanine blue pigment (20 g) and wax (3 g) are added, and the mixture is kneaded well by a three roll mill. Then, p,p'-bis(dimethylamino)benzophenone (7 g) and benzophenone (5 g) are further added thereto to prepare an ultraviolet ray-curable printing ink. On the other hand, similar preparation of ultraviolet ray-curable printing inks are effected using the reaction products obtained in Reference Examples 1 to 3.

Using the thus obtained ultraviolet ray-curable printing inks, printing of coated paper is effected by the use of sheet-fed offset printing machine (manufactured by Color Metal: name of machine, Pearl), and the printed surface is irradiated with ultraviolet rays by an ultraviolet ray-irradiating apparatus (manufactured by Oak; using high pressure mercury lamp) linked with the printing machine. The curability and the printability are investigaged.

The ultraviolet ray-curable inks using the reaction products obtained in Examples 1 to 7 and 16 to 18 are completely cured even under the printing speed of 30 m/min with excellent stability on machine and sufficient printability, without causing emulsification or other troubles, and the printed material thus obtained is superior in gloss.

As to the ultraviolet ray-curing inks using the reaction products obtained in Reference Examples 1 to 3, to the contrary, the ink comprising the product of Reference Example 3 is not cured completely under the printing speed of 30 m/min. In this case, emulsification is caused, and the stability on machine and the printability are insufficient. The inks comprising the products of Reference Examples 1 and 2 are cured almost completely under the printing speed of 30 m/min. But, the ink comprising the product of Reference Example 1 has a low viscosity and its transfer is insufficient. In the ink comprising the product of Reference Example 2, emulsification is caused. In both cases, the stability on machine is inferior and the printability is insufficient.

EXAMPLE 28

To the reaction product (51 g) obtained in Example 1 which is a water-soluble resin, tetraethylene glycol diacrylate (30 g), ethylene glycol monoacrylate (4 g), a polyester resin obtained from polyethylene glycol (molecular weight, 600), propylene glycol, maleic acid and phthalic anhydride (10 g), and benzoin methyl ether (5 g) are added to prepare a photosensitive resin composition. The thus obtained composition is applied uniformly to the surface of an anode-oxidized aluminium plate which is provided with a halation-preventing layer serving also as an adhesive layer to make a thickness of 0.7 mm. To the coated surface, a negative film is placed, and irradiation of ultraviolet rays is effected to cure the imaged area. Then, the negative film is removed, and developing is effected with water, whereby an excellent relief pattern is obtained Using the thus obtained relief pattern, letterpress printing is effected with a conventional printing ink of oxidation-polymerization-drying type, whereby an excellent printed material is obtained.

EXAMPLE 29

To the reaction product (60 g) obtained in Example 1, 1,6-hexanediol diacrylate (25 g), 2-ethylhexyl acrylate (10 g), talc (15 g), phthalocyanine blue pigment (0.2 g), dioctyl phthalate (3 g), benzil (3.5 g) and 2-ethylanthraquinone (2 g) are added to prepare an ultraviolet ray-curable ink for solder resist. Then, screen printing with the thus obtained ink is effected by the use of a screen of 250 mesh to make a thickness of about 15μ on a printed circuit, and the printed surface is irradiated with ultraviolet rays by the aid of the same ultraviolet ray-irradiating apparatus as in Example 22. The thus cured coated film shows a pencil hardness of 3H, and an close-adherence of 100/100 (peeling-off of tape in squares of 1×1 mm) and is excellent in insulating resistance, chemical resistance, soldering resistance and heat resistance.

EXAMPLE 30

To the reaction product (60 g) obtained in Example 13, diethylene glycol diacrylate (25 g), talc (15 g), phthalocyanine blue pigment (0.2 g), dioctyl phthalate (3 g), benzil (3.5 g) and 2-ethylanthraquinone (2 g) are added to make an ultraviolet ray-curable ink for solder resist. Using the thus obtained ink, printing is effected in the same manner as in Example 29. The obtained coated film after curing shows a pencil hardness of 3H and a close-adherence of 100/100 (peeling-off of tape in squares of 1×1 mm) and is excellent in insulating resistance, chemical resistance, soldering resistance and heat resistance.

What is claimed is:

1. A radiation curable resin composition which comprises (I) a photopolymerization initiator and (II) a radiation curable resin obtained by reaction of (A) an alkoxymethylated melamine selected from the group consisting of methoxymethylmelamines, ethoxymethylmelamines, butoxymethylmelamines, compounds in which different kinds of methoxymethyl, ethoxymethyl or butoxymethyl groups are held on the same melamine nucleus and polymers thereof, (B) an α,β-ethylenically unsaturated compound having at least one hydroxyl group selected from the group consisting of esters of alpha, beta-ethylenically unsaturated carboxylic acids with polyhydric alcohols, and reaction products obtained by reaction of epoxy compounds with hydroxyl group-containing (meth) acrylates, (meth) acrylic acids or itaconic acid and (C) at least one member selected from the group consisting of (1) polyols selected from the group consisting of ethylene glycol, diethylene glycol, triethylene glycol, tetraethylene glycol, dipropylene glycol, tripropylene glycol, tetrapropylene glycol, polypropylene glycols, 1,3-propanediol, 1,4-butanediol, 1,3-butanediol, 1,5-pentanediol, neopentyl glycol, 1,6-hexanediol, 1,8-octanediol, glycerin, trimethylolethane, trimethylolpropane, pentaerythritol, sorbitol and the etherification-condensed compounds of said polyols, bisphenols, hydrogenated bisphenols, halogenated bisphenols and resorcinol, (2) polyether polyols obtained by reaction of above-defined polyols with alkylene oxides, and (3) higher fatty acid esters having at least one hydroxyl group.

2. The curable resin composition according to claim 1, wherein a polymerizable vinyl monomer is contained in addition to the photopolymerization initiator and the radiation curable resin.

3. The curable resin composition according to claim 2, wherein the proportion of the polymerizable vinyl monomer is 70% by weight or less, based on the weight of the radiation curable resin composition.

4. The curable resin composition according to claim 2, wherein the proportion of the photopolymerization initiator is 0.1 to 30% by weight to the amount of the curable resin or to the total amount of the curable resin and the polymerizable vinyl monomer.

5. The curable resin composition according to claim 1, wherein at least one of coloring agents, polymerizable or non-polymerizable oils and fats and resins and other additives is contained in addition to the photopolymerization initiator and the radiation curable resin.

* * * * *